United States Patent Office 3,401,732
Patented Sept. 17, 1968

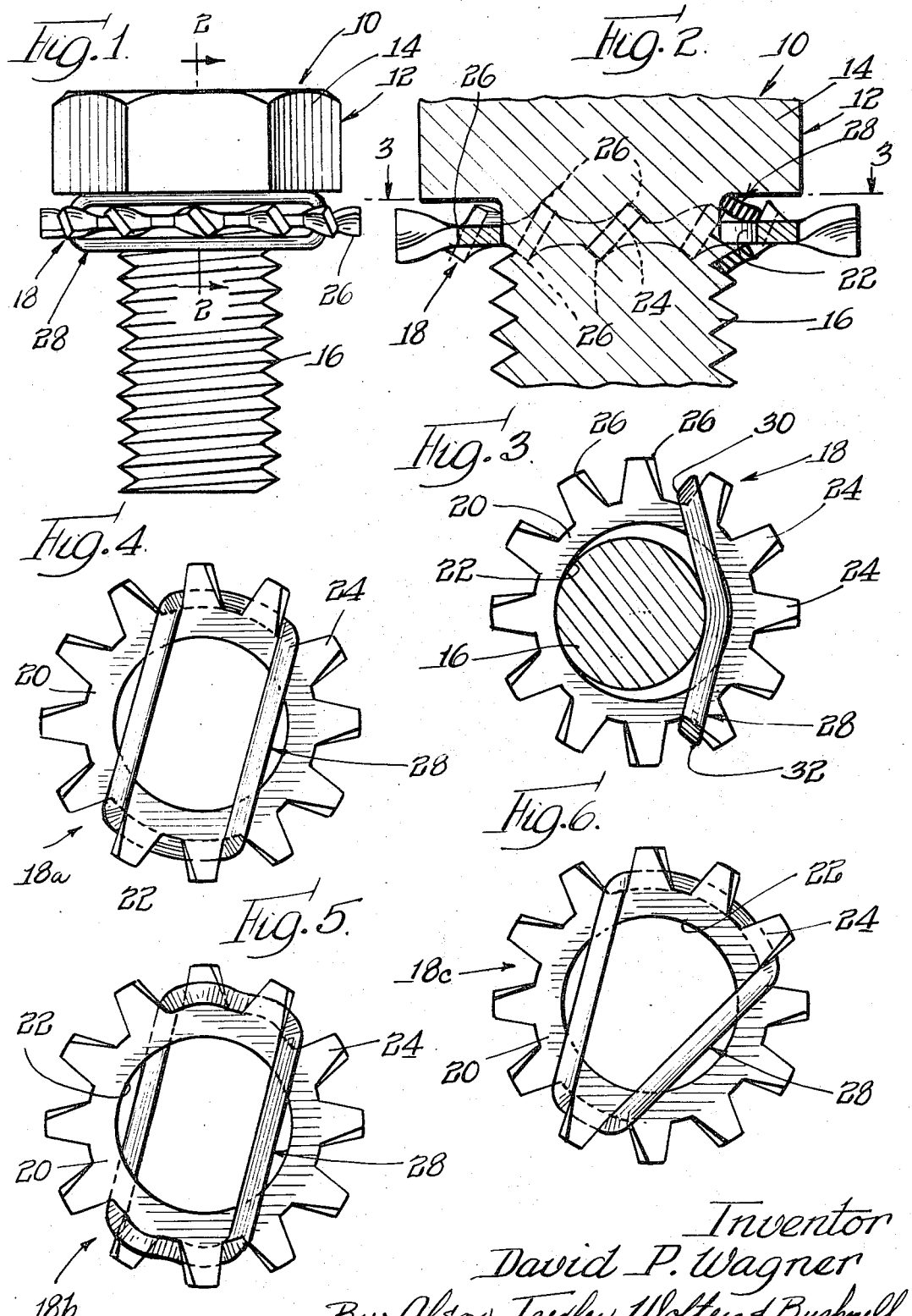

3,401,732
LOCKING DEVICE
David P. Wagner, Elmhurst, Ill., assignor to Illinois Tool Works Inc., Chicago, Ill., a corporation of Delaware
Filed May 2, 1966, Ser. No. 546,869
4 Claims. (Cl. 151—37)

ABSTRACT OF THE DISCLOSURE

The present invention relates generally to fastener devices and more particularly to fastener devices of the preassembled type comprising a rotary threaded fastener and lockwasher, and the invention relates also to lockwasher structures of the particular type used in such assemblies. More specifically, the fastener structure as described herein includes a lockwasher having in association therewith a resilient cord means normally traversing a portion of the washer opening and so spaced from the washer axis as to present a screw accommodating opening of such axis width that a complementary threaded screw shank will automatically spread the resilient cord means upon initial engagement therewith to permit complete telescoping association and contemporaneous assembly of the washer and threaded screw shank adjacent the clamping face of the screw head.

Description of invention

One of the well-known preassembled fastener units now available on the market consists of a rotary threaded fastener such as a screw having in telescopic association therewith a lockwasher which is secured against axial separation from the fastener member by protuberant means such as a thread convolution which projects radially outwardly beyond the internal diameter of the washer member. The preassembled fastener unit contemplated by the present invention is one in which the internal diameter of the washer member is not less and preferably slightly larger than the maximum diameter of the thread convolutions on the screw shank. Hence the present invention contemplates the use of means other than the thread convolutions per se to secure the washer against axial separation from the screw shank. The present invention is therefore primarily concerned with the provision of a novel and extremely practical arrangement whereby, once a washer and shank have been telescopically associated, these parts will become automatically preassembled with the washer member secured against unauthorized axial movement along the fastener shank.

It is therefore one of the important objects of the present invention to make it possible for a rotary threaded fastener member having a shank extending from the clamp ing side thereof to be permanently assembled with a lockwasher by merely telescopically associating the shank and washer.

More specifically it is an object of the present invention to accomplish the above mentioned telescopic assembly of the rotary threaded fastener and lockwasher by providing a novel structural feature in association with the washer member which will cause the parts to become permanently assembled by telescopic association.

It is a further object of the present invention to provide a novel lockwasher arrangement wherein the lockwasher body is equipped with means which adapts the washer for automatic assembly with the shank portion of a rotary threaded fastener.

Still more specifically the invention contemplates the unique lockwasher arrangement referred to above which is relatively inexpensive to produce and requires no structural alteration or modification of the washer member per se in order to adapt it for the automatic assembly referred to above.

The foregoing and other objects and advantages will be more apparent from the following detailed description when considered in connection with the accompanying drawing wherein:

FIG. 1 is a side elevational view of a preassembled fastener unit representing one embodiment of the present invention;

FIG. 2 is an enlarged fragmentary portion of the fastener unit shown in FIG. 1 taken substantially along the line 2—2 of FIG. 1;

FIG. 3 is a horizontal sectional view taken substantially along the line 3—3 of FIG. 2;

FIG. 4 is a plan view of a lockwasher equipped with a modified arrangement of resilient or laterally yieldable cord means which will permit telescopic association of the lockwasher with a shank of a rotary threaded fastener and will cooperate also to secure the lockwasher against unauthorized separation after assembly with the fastener member;

FIG. 5 is a slightly modified arrangement of the resilient washer retaining element or cord means shown in association with a toothed lockwasher of the type illustrated in FIGS. 3 and 4; and FIG. 6 is a plan view similar to FIGS. 4 and 5 disclosing a slightly modified arrangement of the laterally yieldable resilient cord element which normally traverses a portion of the lockwasher opening.

Referring now to the drawing more in detail wherein like numerals have been employed to designate similar parts throughout the various views, it will be seen that one embodiment of the invention consists of a preassembled fastener unit designated generally by the numeral 10 in FIGS. 1 and 2. This fastener unit 10 includes a rotary threaded fastener or screw member 12 having a head 14 and a threaded shank 16 extending axially from the clamping side of the head. The fastener unit 10 also includes a lockwasher device designated generally by the numeral 18. The lockwasher device 18 includes an annular body portion 20 which defines an opening 22 for accommodating the shank of a rotary threaded fastener such as the threaded shank 16. The lockwasher device 18 is also provided with a plurality of external prongs 24 formed integral with the body 20, each prong being twisted or warped so as to present work impinging or locking teeth 26 normally projecting beyond the opposite sides of the plane of the body 20. It will be noted that the diameter of the washer opening or aperture 22 is not less than but preferably slightly larger than the external diameter of the threaded shank 16.

In order to secure the lockwasher device 18 in permanent assembled relation with the rotary threaded fastener 10 after the parts have been telescopically associated as shown in FIGS. 1 and 2, a resilient retaining device designated generally by the numeral 28 is employed which forms a part of the lockwasher structure. This device 28 is in the form of an elastic or rubber band which may be stretched across the opening 22 of the lockwasher 18 as illustrated in the various views.

In FIGS. 1 to 3 inclusive the resilient washer retaining device 28 consists of a rubber band stretched between oppositely disposed prong separating notches 30 and 32 of the washer structure 18. Thus before the lockwasher is assembled with the rotary threaded screw member 10 the retaining device 28 presents a pair of resilient cord members which traverse a portion of the lockwasher opening 22. In order for the lockwasher to telescopically accommodate the threaded screw shank 16, the cord members must yield laterally as incident to the engagement therewith of shank 16. When the lockwasher and rotary fastener have been completely assembled as shown in FIGS. 1 to 3 inclusive, the resilient retaining device or cord means springs inwardly to the position shown in FIG. 3. In this position the cord members superimpose thread convolutions adjacent the clamping surface of the fastener head 14 and thereby resist unauthorized axial shifting of the lockwasher away from the clamping surface of said head. By this simple yet expedient means the automatic preassembly of the rotary screw threaded fastener and lockwasher may be obtained by simply telescoping the parts.

In FIG. 4 a lockwasher designated generally by the numeral 18a is disclosed and the only difference between the structural arrangement of the lockwasher 18a and the lockwasher 18 previously described is in the disposition of the resilient washer retaining device 28. In the lockwasher 18a the resilient washer retaining device 28 is stretched between a pair of washer prongs on one side and a pair of oppositely disposed washer prongs. By this arrangement the cord members presented by the elastic band 28 are parallel and spaced laterally. In the lockwasher 18 previously desicribed the cord members are parallel and are in superimposed alignment. In other words, the parallel laterally spaced cord members of the device 28 in FIG. 4 must each be yieldably spread apart as an incicent to the engagement therewith of the complementary threaded shank member 18 in order to permit telescopic assembly of the parts.

In FIG. 5 the lockwasher designated by the numeral 18b is similar to the arrangement shown in FIG. 4 with the exception that in FIG. 4 the resilient cord members of the retaining device 28 are positioned on the same side of the lockwasher whereas in the washer 18b of FIG. 5 the resilient cord members are disposed on opposite sides of the washer body. FIG. 6 discloses a still further modified form of washer designated generally by the numeral 18c. The only difference structurally between the washer 18c and the previously described washer is in the disposition of the resilient cord members of the washer retaining means 28. The resilient retaining means of the washer 18c presents cord members which are inclined with respect to each other as distinguished from the parallel arrangement shown in FIGS. 4 and 5. According to FIGS. 4, 5 and 6, the stretched band sections extend chordally across the central opening on opposite sides of the central axis thereof and closer to the adjacent periphery of the central opening than to the central axis thereof, thus to assure lateral spreading of the stretched band sections as an incident to telescopic association of a fastener shank with the washer by passing through the central opening thereof. In all of the embodiments disclosed herein the resilient washer retaining means presents at least one cord member which traverses the washer opening so as to require that this resilient cord member be laterally displaced as an incident to the engagement therewith of a complementary shank member in order to effect ultimate assembly. Also, in all instances the resilient cord member carried by the washer member normally traverses the aperture of the lockwasher prior to the assembly thereof with a shank member. By this arrangement the cord members or means provide a laterally yieldable abutment cooperable with protuberant means, such as a thread convolution in initially yielding laterally to permit telescopic association of the lockwasher and shank and to thereafter spring laterally into overlapping relationship with said thread convolution.

From the foregoing it will be apparent that the present invention provides a novel and highly practical arrangement whereby loose lockwashers may be telescopically associated with a threaded shank member and contemporaneously secured in preassembled relation on said shank. In the present disclosure the thread convolutions provide protuberant means beneath the head of the rotary clamping member. Obviously other forms of protuberant means could be employed without departing from applicant's inventive concept. It is also contemplated that resilient cord members of the type shown herein may be secured to the washer member by suitable adhesive materials as distinguished from the rubber band washer retaining device described herein. In other words, while the invention has been described in connection with certain specific embodiments thereof, it should be understood that other modifications and changes are contemplated without departing from the spirit and scope of the appended claims.

The invention is claimed as follows:

1. A lockwasher assembly including a lockwasher member having an annular body portion with the inner margin thereof defining a central opening to receive a fastener shank and a plurality of circumferentially spaced work impinging teeth formed integral with and extending radially outwardly from the outer margin of said body portion; and resilient cord means preassembled as a unit with said lockwasher member and comprising an endless band stretched between oppositely disposed teeth and presenting a pair of stretched band sections chordally traversing the central opening on opposite sides of the central axis thereof and with each band section positioned closer to the adjacent periphery of the central opening than to the central axis thereof providing between the stretched band sections a space sufficient to assure radial expansion of the band sections as an incident to engagement therewith of the entering end of a complementary fastener shank.

2. A lockwasher assembly as claimed in claim 1, wherein the stretched band sections are substantially parallel to one another.

3. A lockwasher assembly as claimed in claim 1, wherein the stretched band sections are inclined with respect to one another.

4. A fastener unit including a rotary threaded fastener member having a generally radially extending clamping face, a shank extending axially from the clamping side of said fastener member, protuberant means extending radially from said shank and spaced axially from said clamping face, a lockwasher encircling said shank between said protuberant means and clamping face and comprising an annular internal body portion and a plurality of circumferentially spaced work impinging teeth formed integral with the outer margin of said body portion, and resilient cord means carried by and normally traversing the opening in the body portion and comprising an endless resilient band stretched between oppositely disposed teeth with sections of said band extending on opposite sides of the body portion and located to one side of the central axis thereof to provide a laterally yieldable abutment cooperable with said protuberant means in initially yielding outwardly laterally to permit telescopic association of the lockwasher and shank and thereafter springing laterally inwardly to resist unauthorized telescopic separation of the parts.

References Cited

UNITED STATES PATENTS

| 1,874,462 | 8/1932 | Crowthen | 151—37 |
| 2,176,411 | 10/1939 | Washen | 151—37 |
| 2,348,390 | 5/1944 | Kass | 85—35 |
| 2,983,534 | 5/1961 | Hellen et al. | 151—35 |

EDWARD C. ALLEN, Primary Examiner.